Dec. 9, 1924.
E. SCHRÖDER
ELECTRIC WELDING AND HEATING DEVICE
Filed April 3, 1922
1,519,062
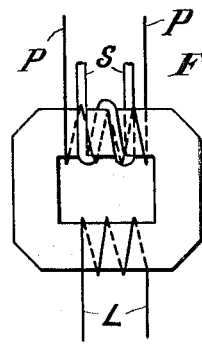
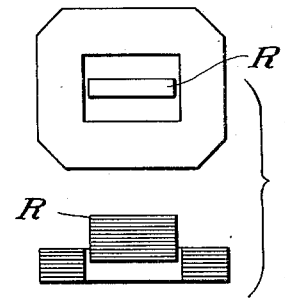
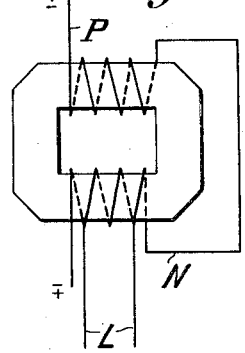
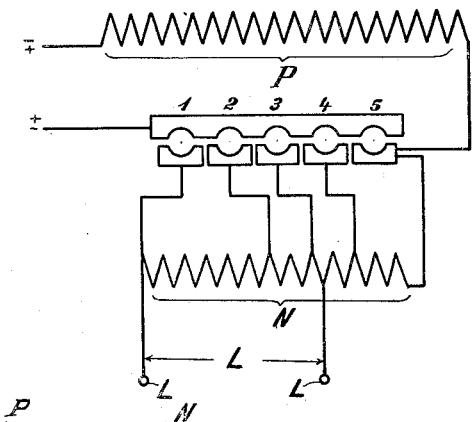
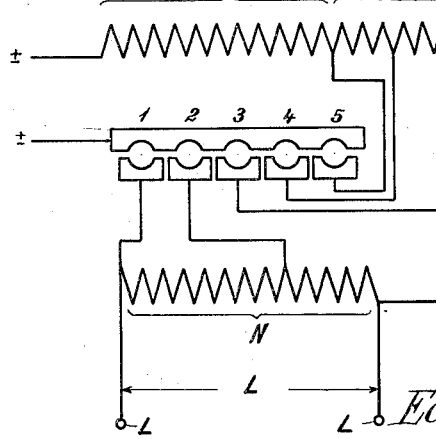
INVENTOR.
Edmund Schröder.
By William C. Linton
Atty.

Patented Dec. 9, 1924.

1,519,062

UNITED STATES PATENT OFFICE.

EDMUND SCHRÖDER, OF BERLIN, GERMANY, ASSIGNOR TO THE FIRM, BRAUN-BRÜNING & CO., OF BASEL, SWITZERLAND.

ELECTRIC WELDING AND HEATING DEVICE.

Application filed April 3, 1922. Serial No. 549,082.

*To all whom it may concern:*

Be it known that I, EDMUND SCHRÖDER, engineer, a citizen of the German Republic, residing at Berlin, in the Republic of Germany, have invented a certain new and useful Electric Welding and Heating Device; and I do hereby declare that the following is a full, clear, and exact description of the invention, such as will enable others skilled in the art to which it appertains to make and use the same.

This invention relates to a new arrangement of the coils required in electric welding and heating machines. With all resistance machines, the output, especially concerning weldings, is limited by the kilowatt-output of the transformer. For instance, with a transformer output of 12 kilowatts, butt-weldings at the highest up to 500 mm$^2$., seam-welding at the highest up to 7 mm. total thickness, and point-weldings also up to this limit, can be made. If weldings of various kinds are to be made with one machine, the size of same to render it fit for all kinds of work required, must be chosen according to the greatest welding output occurring, even if the greatest sectional areas of the material or the greatest thicknesses occur only exceptionally. Such a machine is, thus, very expensive, and manufacturers abstain from introducing the resistance welding method, instead of substituting it for the older and, in the majority of cases, considerably more expensive methods.

Considerably more adaptable, concerning the range of work, is arc-welding, because, with this kind of welding, the effect of a small kilowatt-output can be profitably utilised also in connection with working pieces of comparatively large dimensions by distributing it over a longer time. But as regards small work-pieces and small sectional areas, the manner of operation of the arc-welding method is comparatively expensive, especially in comparison to the resistance welding method. Sometimes both kinds of welding are employed, each with its special devices, but there are then two sets of apparatus, with a resultant heavy outlay.

The above disclosed disadvantages are obviated by the welding machine forming the subject-matter of the present invention, permitting of the application of both kinds of welding without additional costs and considerably extending the range of work of one machine, making it capable of doing the work of two different machines of the older types. The transformer of a resistance welding and heating machine receives, according to this invention, a second coil, the dimensions and arrangement of which are such, that the current supplied by this coil feeds an arc for the arc-welding purpose.

In order to make my invention more clear, I refer to the accompanying drawing, in which Figure 1 is a diagrammatical illustration of a resistance welding transformer constructed according to this invention. Figure 2 is a similar illustration, but without the coils and in connection with an additional iron member. Figure 3 is also a similar illustration showing a modified arrangement of the coils. Figure 4 is a wiring diagram, in connection with a switch. And Figure 5 is a similar illustration showing a modification.

Referring to Figure 1, the resistance welding transformer shown is, of known construction. The one limb has the primary coil P, as well as the secondary coil S, and the other limb is provided with a coil L which produces the arc-feeding current. The number of windings of this coil are such that the voltage required for the arc, i. e. from 60 to 80 volts, is obtained. Owing to the arrangement of the coil L upon the second limb of the transformer, the magnetic leakage therein is great, when current is taken from said coil L in question. The decrease of voltage arising in the coil L, if this latter is loaded, prevents, an overloading of the transformer so that the short-circuit arising on initiating the arc has no hurtful effect. The primary coil is provided with several tapping points, in the manner known with welding machines, so that several voltages may be had in the secondary circuit. Furthermore, a regulation of the voltage in the arc-circuit may be obtained by providing the coil L with several tapping points. By a high saturation in the whole of the iron circuit, or in a portion of it, or by other known and similarly acting means, the magnetic leakage may even be further increased and the short-circuit in the coil L still more diminished. Such a means may consist, for instance, in a displaceable regulating core R, Figure 2, which forms a shunt to the path of the lines of force.

An especially advantageous arrangement is shown in Figure 3. In this instance the transformer-limb having a low-tension secondary coil, which produces the low-tension current for the welding operation; also carries the main coil P, which produces the highest voltage. The usual windings, adapted to feed the welding arc from tappings provided at suitable voltage points, surround the other core limb. A portion of these windings may, however, feed the arc by means of the tappings L. The sectional area of these windings is determined according to the greatest arc-output.

Figure 4 shows a wiring diagram of the heretofore described arrangement. The primary main coil P lies upon the core limb which carries the secondary coil. The various tappings are connected with the plug contact members 1 2 3 4 5, or with equivalent contact members. The regulation windings N surround the other core limb. The windings lying between the arc-connections L feed the arc.

As, in the usual arc-welding process, the arc-tension does not require all regulation windings, the wiring-diagram may be executed also in the manner illustrated in Figure 5. In this instance two regulation coils N not required for the arc lie also upon the main core limb. By switching these windings in or out, a three-fold regulation of the arc-voltage is obtained. If, for instance, the maximum secondary voltage for resistance welding amounts to 2, 2 volts, which are regulated in 5 steps down to 1, 3 volts, there are in the lowest two steps for 220 volts of the primary current about 40 windings at disposal, which produce arc-tensions of from about 88 down to about 80 and to about 72 volts.

The machine provided with the above-described novel arrangement of the coils, or windings respectively, permits not only to attain the range of work of a corresponding resistance welding machine, as well as that of an arc apparatus, but, furthermore, work heretofore impossible with other apparatus may be done, as, for instance, the welding of grey cast iron. With the resistance welding method such iron cannot be welded at all, and arc-welding requires pre-heating of the work-pieces by gas or coal or the like in order to deliver the effect desired.

If a butt-welding machine is furnished with the novel coil-arrangement, the appropriately prepared work piece is pre-heated by means of a low-tension current in a manner known with such machines, and the welding is then carried through and finished with the arc. Or, if a butt-welding is to be made with iron having such a sectional area that the output of the machine does not suffice to produce the welding temperature, the welding place is preheated by means of a low-tension on current and the welding is then carried through and finished with the arc. In the case of seam-welding, the seam is preheated in zones, after which the welding procedure proceeds as just mentioned. Thus, by combining the two kinds of welding, the working range of the two machines is considerably extended.

Having now described my invention, what I desire to secure by a Patent of the United States is:

1. In an electric resistance welding- and heating-machine, a transformer, windings surrounding a limb of said transformer and being adapted to feed a welding arc, substantially as described.

2. In an electric resistance welding- and heating-machine, a transformer, regulation windings surrounding a limb of said transformer adapted to feed a welding arc, and tappings provided at said windings at suited voltage-points.

In witness whereof I have hereunto set my hand.

EDMUND SCHRÖDER.